US008424280B2

(12) United States Patent
Moore et al.

(10) Patent No.: US 8,424,280 B2
(45) Date of Patent: Apr. 23, 2013

(54) GAS TURBINE ENGINE ARRANGEMENT (75) Inventors: Gareth E Moore, Nottingham (GB); David R Trainer, Derby (GB); David P Scothern, Derby (GB); David S Knott, Loughborough (GB); Paul Simms, Melton Mowbray (GB)

(73) Assignee: Rolls-Royce, PLC, London (GB)

( * ) Notice: Subject to any disclaimer, the term of this patent is extended or adjusted under 35 U.S.C. 154(b) by 1057 days.

(21) Appl. No.: 12/379,594

(22) Filed: Feb. 25, 2009

(65) Prior Publication Data
US 2010/0024434 A1 Feb. 4, 2010

(30) Foreign Application Priority Data

Mar. 20, 2008 (GB) .................................. 0805177.3

(51) Int. Cl.
*F02C 6/00* (2006.01)
(52) U.S. Cl.
USPC .............................. 60/39.163; 60/788; 60/802
(58) Field of Classification Search ............... 60/39.163, 60/39.183, 778, 786–788, 801–802, 39.45, 60/793; 74/DIG. 5; 244/58; 475/1, 5, 223–224
See application file for complete search history.

(56) References Cited

U.S. PATENT DOCUMENTS

| 3,145,532 A | 8/1964 | Moss |
| 3,307,426 A | 3/1967 | Whitaker |
| 3,662,544 A * | 5/1972 | Kahn et al. ........................ 60/788 |
| 4,077,202 A * | 3/1978 | Schutze ........................... 60/788 |
| 6,316,841 B1 | 11/2001 | Weber |
| 2006/0042252 A1* | 3/2006 | Derouineau ..................... 60/703 |
| 2006/0258233 A1* | 11/2006 | Wilson et al. ................... 440/53 |
| 2007/0137219 A1* | 6/2007 | Linet et al. ...................... 60/802 |
| 2007/0151258 A1* | 7/2007 | Gaines et al. ................... 60/792 |

FOREIGN PATENT DOCUMENTS

| EP | 1 777 374 A2 | 4/2007 |
| EP | 1 777 374 A3 | 4/2007 |
| EP | 1 777 393 A1 | 4/2007 |
| GB | 1221430 | 2/1971 |
| GB | 1 509 835 | 5/1978 |
| GB | 2 076 062 A | 11/1981 |

OTHER PUBLICATIONS

Nov. 27, 2012 Search Report issued in European Patent Application No. 09 25 0502.

* cited by examiner

*Primary Examiner* — Ehud Gartenberg
*Assistant Examiner* — Scott Walthour
(74) *Attorney, Agent, or Firm* — Oliff & Berridge, PLC (57) ABSTRACT A gas turbine engine arrangement comprises a first gas turbine engine, a second gas turbine engine, a differential gearbox and an electrical generator. The differential gearbox has a first input drive, a second input drive and an output drive. The output drive of the differential gearbox is arranged to drive the electrical generator via an external, accessory, gearbox. The external, accessory, gearbox drives other accessories. The first gas turbine is arranged to drive the first input drive of the differential gearbox and the second gas turbine engine is arranged to drive the second input drive of the differential gearbox. The electrical generator and accessories are driven at a constant frequency speed/frequency.

21 Claims, 5 Drawing Sheets

GAS TURBINE ENGINE ARRANGEMENT

The present invention relates to a gas turbine engine arrangement and is particularly concerned with gas turbine engine arrangements comprising electrical generators.

Currently most gas turbine engines comprise an accessory gearbox and an integrated drive generator (IDG), which is driven by the accessory gearbox to provide a constant electrical frequency output. In this arrangement the integrated drive generator has only a single input and a single constant speed output drive.

These integrated drive generators are unreliable and have low efficiency.

Accordingly the present invention seeks to provide a novel gas turbine engine arrangement comprising an electrical generator which reduces, preferably overcomes, the above mentioned problem.

Accordingly the present invention provides a gas turbine engine arrangement comprising a first gas turbine engine, a power unit, a differential gearbox and at least one electrical generator, the differential gearbox having a first input drive, a second input drive and an output drive, the output drive of the differential gearbox being arranged to drive the at least one electrical generator, the first gas turbine being arranged to supply power to the first input drive of the differential gearbox and the power unit being arranged to supply power to, or remove power from, the second input drive of the differential gearbox.

Preferably the first gas turbine engine is an aircraft gas turbine engine.

Preferably the first gas turbine engine is a turbofan gas turbine engine.

Preferably the power unit is a second gas turbine engine.

Preferably the second gas turbine engine is an auxiliary power unit.

Preferably the first gas turbine engine drives the first input drive above a predetermined torque level and below a predetermined speed and the second gas turbine engine drives the second input drive with a torque level less than the predetermined torque level and with a speed above the predetermined speed.

Preferably the first gas turbine engine having a power offtake and the power offtake is arranged to drive the first input drive.

Preferably there are means to measure the speed of the first input drive and control means to adjust the speed of the second input drive such that the speed of the output drive maintained substantially constant.

Preferably there are means to measure the speed of the output drive and control means to adjust the speed of the second input drive such that the speed of the output drive is maintained substantially constant.

Preferably the control means controls the supply of fuel to the second gas turbine engine.

Preferably the first input drive has a first brake such that the first brake is operable to prevent rotation of the first input drive if the first gas turbine engine and/or first input drive fails.

Preferably the second input drive has a second brake such that the second brake is operable to prevent rotation of the second input drive if the second gas turbine engine and/or second input drive fails.

A clutch or a fluid coupling may be provided between the first input drive and the first gas turbine engine to allow the second gas turbine engine to start the first gas turbine engine.

Alternatively a clutch or a fluid coupling may be provided between the second input drive and the second gas turbine engine to allow the second gas turbine engine to start the first gas turbine engine.

Preferably the output drive has a third brake such that the third brake is operable to prevent rotation of the output drive to allow the second gas turbine engine to start the first gas turbine engine.

Preferably the electrical generator is a motor/generator to allow the electrical generator to start the first gas turbine engine and/or the second gas turbine engine.

Preferably the second gas turbine engine is integrated with the first gas turbine engine.

Preferably the differential gearbox comprising a sun gear, a plurality of planet gears, and an annulus gear, the planet gears meshing with the sun gear and the annulus gear, the planet gears being rotatably mounted on a carrier.

The second input drive may be connected to the sun gear, the first input drive being connected to the annulus gear and the output drive being connected to the carrier.

The second input drive may be connected to the sun gear, the first input drive being connected to the carrier and the output drive being connected to the annulus gear.

The second input drive may be connected to the annulus gear, the first input drive being connected to the sun gear and the output drive being connected to the carrier.

Alternatively the power unit may comprise a responsive electrical machine to remove power from the second input drive of the differential gearbox. The responsive electrical machine may comprise an electrical machine arranged to supply an electrical load or a variable speed electrical motor.

The electrical generator may be a constant frequency electrical generator, a specific frequency electrical generator or a DC electrical generator.

A specific frequency electrical generator is an electrical generator which matches the electrical frequency of the electrical network to the frequency required by the largest electrical load/consumer on the electrical network.

The output drive of the differential gearbox may be arranged to drive the electrical generator via an accessory gearbox. The accessory gearbox may be arranged to drive at least one accessory. The at least one accessory may be at least one fuel pump, at least one oil pump or at least one oil breather.

The first gas turbine may be arranged to drive the first input drive of the differential gearbox via an accessory gearbox. The accessory gearbox may be arranged to drive at least one accessory. The at least one accessory may be at least one fuel pump, at least one oil pump or at least one oil breather. The output drive of the differential gearbox may be arranged to drive the electrical generator via an additional accessory gearbox. The additional accessory gearbox may be arranged to drive at least one accessory. The at least one accessory may be at least one fuel pump, at least one oil pump or at least one oil breather.

The present invention will be more fully described by way of example with reference to the accompanying drawings in which:—

Figure 1:
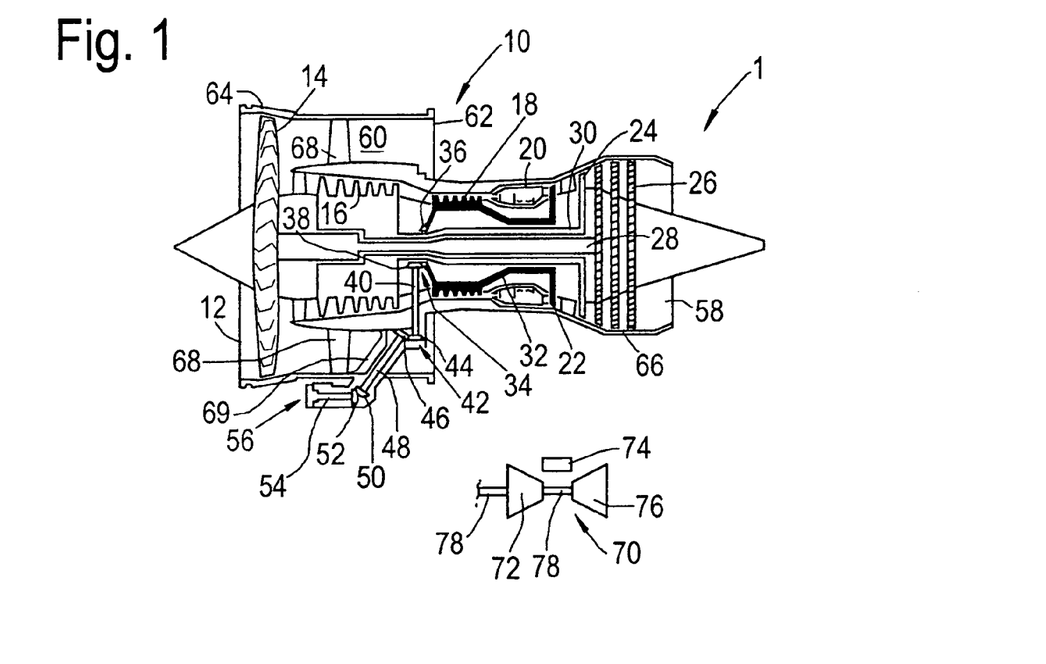
FIG. 1 shows a cross-sectional view of a turbofan gas turbine engine and an auxiliary power unit of a gas turbine engine arrangement according to the present invention.
Figure 2:
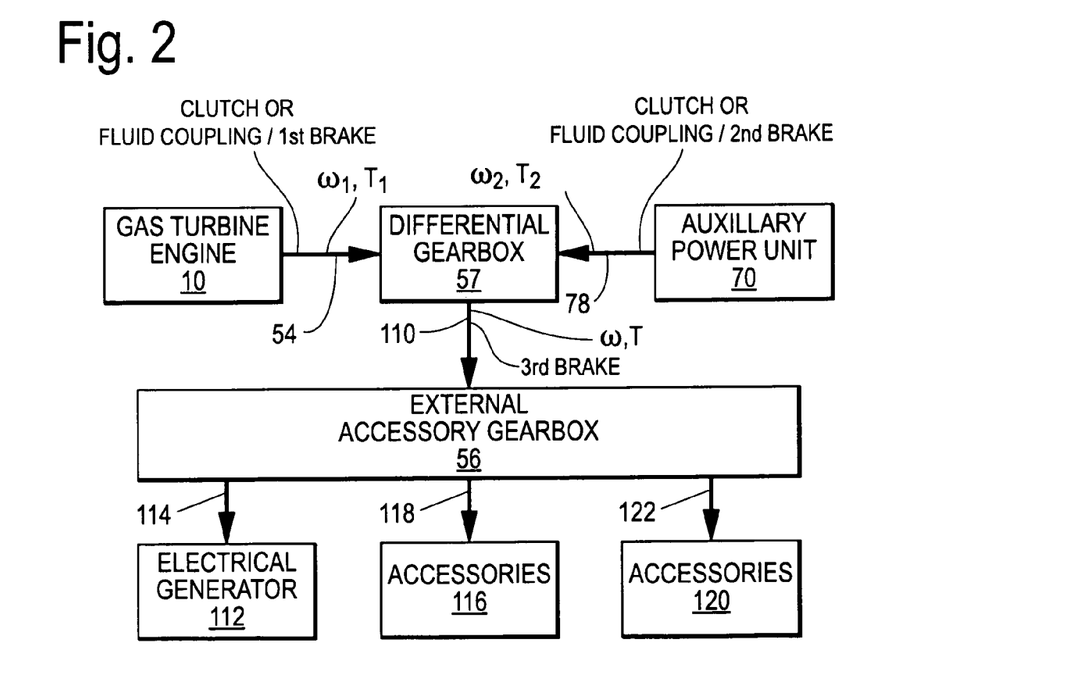
FIG. 2 shows a schematic view of a differential gearbox for a gas turbine engine arrangement according to the present invention.

A gas turbine engine arrangement 1 according to the present invention, as shown in FIGS. 1 and 2, comprises a first gas turbine engine 10, in this example a turbofan gas turbine engine and a second gas turbine engine 70, in this example an auxiliary power unit.

The turbofan gas turbine engine 10 comprises in flow series an intake 12, a fan 14, an intermediate pressure compressor 16, a high pressure compressor 18, a combustor 20, a high pressure turbine 22, an intermediate pressure turbine 24, a low pressure turbine 26 and an exhaust 58. The low pressure turbine 26 is arranged to drive the fan via a low pressure shaft 28. The intermediate pressure turbine 24 is arranged to drive the intermediate pressure compressor 16 via an intermediate pressure shaft 30 and the high pressure turbine 22 is arranged to drive the high pressure compressor 18 via a high pressure shaft 32.

An internal gearbox 34 is provided at the upstream end of the high pressure shaft 32. The internal gearbox comprises a bevel gear 36 at the upstream end of the high pressure shaft 32 and a bevel gear 38 is arranged on the radially inner end of a radial drive shaft 40. The bevel gear 38 on the radial drive shaft is arranged to mesh with the bevel gear 36 on the high pressure shaft 32. The radial drive shaft 40 extends through a strut extending across the flow path from the intermediate pressure compressor 16 to the high pressure compressor 18.

An intermediate gearbox 42 is provided at the radially outer end of the radial drive shaft 40. The intermediate gearbox 42 comprises a bevel gear 44 on the radially outer end of the radial drive shaft 40 and a bevel gear 46 on an inner end of a further drive shaft 48. In this example the further drive shaft 48 is an angled drive shaft. The bevel gear 44 on the radial drive shaft 40 is arranged to mesh with the bevel gear 46 on the further drive shaft 48. The further drive shaft 48 extends through a strut 69 extending across the bypass duct 60. The bypass duct 60 is partially defined by a fan casing 64, which surrounds the fan 14. The fan casing 64 is supported from a core engine casing 66 by a plurality of radially extending and circumferentially arranged fan outlet guide vanes 68. The strut 69 is arranged axially downstream of the fan outlet guide vanes 68 and upstream of the bypass duct exhaust 62. The housing of the intermediate gearbox 42 is mounted on the core engine casing 66.

A bevel gear 50 is provided on the radially outer end of the further drive shaft 48 and the bevel gear 50 is arranged to mesh with a bevel gear 52 on a final drive shaft 54. The final drive shaft 54 is arranged to provide drive for an external, or accessory, gearbox 56. The external, or accessory, gearbox 56 is arranged to provide drive to the engine accessories e.g. a high pressure fuel pump, a low pressure fuel pump, a centrifugal oil breather, an engine electrical generator, a fuel flow governor, a hydraulic pump and an oil pump etc. The external, accessory, gearbox 56 is also arranged to provide drive to one or more electrical generators 112.

The auxiliary power unit 70 comprises in flow series a compressor 72, a combustor 74 and a turbine 76 and the turbine 76 is arranged to drive the compressor 72 via a drive shaft 78. The shaft 78 is also arranged to provide drive for the external, accessory, gearbox 56. Alternatively the auxiliary power unit may comprises in flow series a compressor, a combustor, a turbine and a power turbine, the turbine is arranged to drive the compressor via a drive shaft and the power turbine is arranged to provide drive for the external, accessory, gearbox 56.

In the gas turbine engine arrangement 1, as shown more clearly in FIG. 2, the final drive shaft 54 of the turbofan gas turbine engine 10 and the drive shaft 78 of the auxiliary power unit 70 provide drive to the external, accessory, gearbox 56. In particular the final drive shaft 54 of the turbofan gas turbine engine 10 and the drive shaft 78 of the auxiliary power unit 70 provide drive to the external, accessory, gearbox 56 via a differential gearbox 57.

The final drive shaft 54 of the turbofan gas turbine engine 10 provides a first input drive of the differential gearbox 57, the drive shaft 78 of the auxiliary power unit 70 provides a second input drive of the differential gearbox 57 and an output drive 110 of the differential gearbox 57 is arranged to drive a constant speed, constant frequency, external, accessory, gearbox 56. The constant speed, constant frequency, accessory gearbox 56 is then arranged to drive at least one electrical generator 112 and at least one accessory 116, 120 via shafts 114, 118 and 122 respectively. The at least one accessory may be at least one fuel pump, at least one oil pump or at least one oil breather etc. Thus, the first gas turbine 10 is arranged to drive the first input drive of the differential gearbox 57 and the second gas turbine engine 70 is arranged to drive the second input drive of the differential gearbox 57 and the constant frequency output drive of the differential gearbox 57 drives one or more electrical generators 112 and one or more other accessories 116, 120 via the accessory gearbox 56.

The differential gearbox 57 is arranged such that first input drive, final drive shaft, 54 has a high torque $T_1$ but a relatively low speed $\omega_1$, the second input drive, drive shaft, 78 is arranged in the opposite manner and has a relatively low torque $T_2$ and a high speed $\omega_2$. Therefore the second input drive 78 has a mechanical advantage over the first input drive 54. The output drive 110 has a torque T and a speed ω and these are a function of the combined torque and speeds of the first and second input drives 54 and 78. Any suitable arrangement of differential gearbox may be used.

Figure 3:
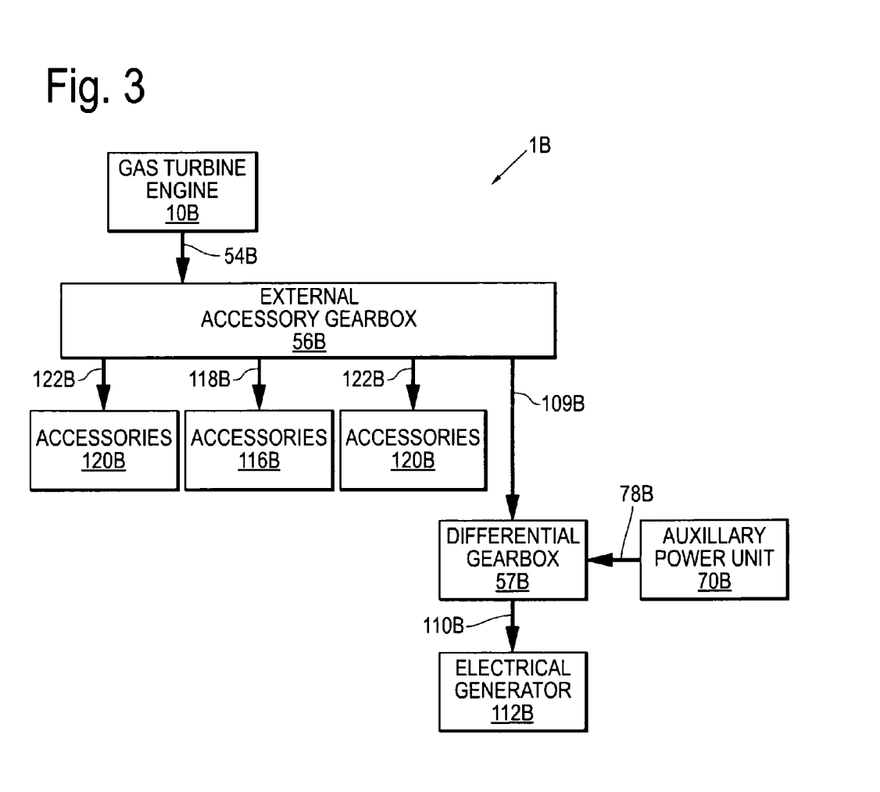
FIG. 3 shows a further schematic view of a differential gearbox for a gas turbine engine arrangement according to the present invention.

In a further gas turbine engine arrangement 1B according to the present invention, as shown more clearly in FIG. 3, a final drive shaft 54B of a turbofan gas turbine engine 10B is arranged to drive a variable speed external, accessory, gearbox 56B. The variable speed external, accessory, gearbox 56B is arranged to drive one or more accessories 116B, 120B via shafts 118B and 122B respectively. The at least one accessory may be at least one fuel pump, at least one oil pump or at least one oil breather etc. The variable speed external, accessory, gearbox 56B also provides drive to a differential gearbox 57B via a shaft 109B. A drive shaft 78B of an auxiliary power unit 70B provides a second input drive of the differential gearbox 57B and an output drive 110B of the differential gearbox 57B is arranged to drive a constant frequency electrical generator 112B. In this arrangement the final drive shaft 54B of the turbofan gas turbine engine 10B provides a first input drive of the differential gearbox 57B, via the variable speed external, accessory, gearbox 56B. Thus, the first gas turbine 10B is arranged to drive the first input drive of the differential gearbox 57B and the second gas turbine engine 70B is arranged to drive the second input drive of the differential gearbox 57B and the constant frequency output drive of the differential gearbox 57B drives one or more constant frequency electrical generators 112B.

Figure 4:
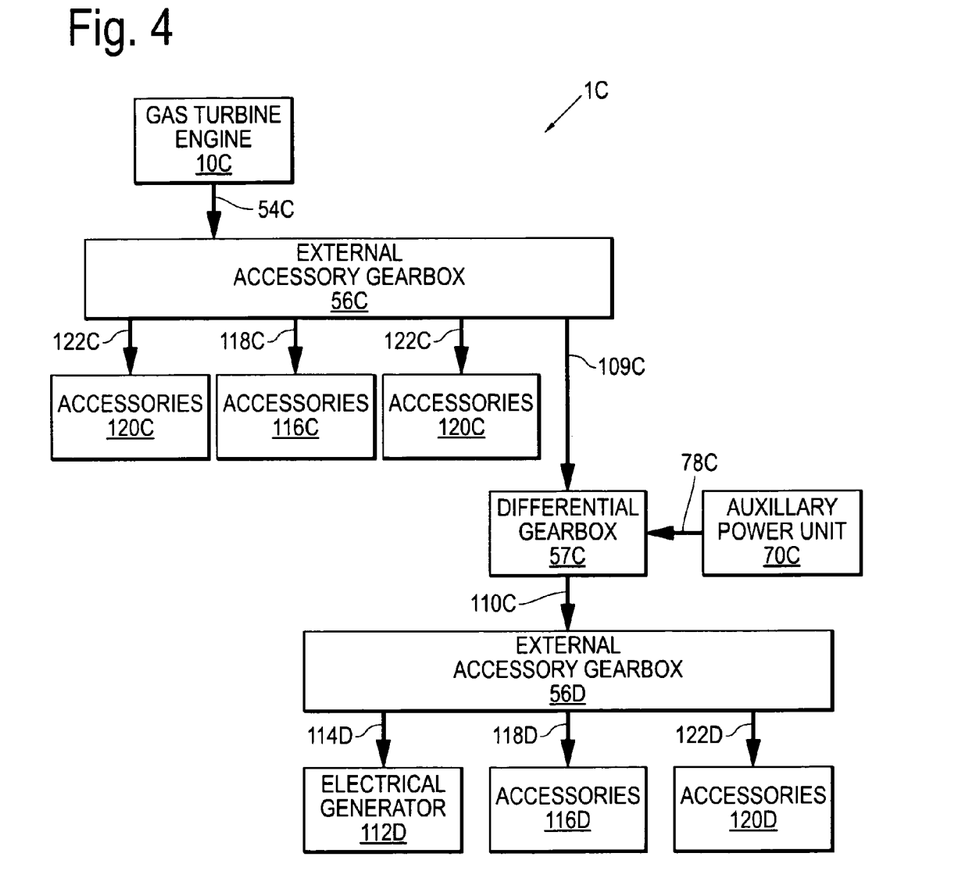
FIG. 4 shows another schematic view of a differential gearbox for a gas turbine engine arrangement according to the present invention.

In another gas turbine engine arrangement 1C according to the present invention, as shown more clearly in FIG. 4, a final drive shaft 54C of a turbofan gas turbine engine 10C is arranged to drive a variable speed external, accessory, gearbox 56C. The variable speed external, accessory, gearbox 56C is arranged to drive one or more accessories 116C, 120C via shafts 118C and 122C respectively. The one or more accessories may be at least one fuel pump, at least one oil pump or at least one oil breather etc. The variable speed external, accessory, gearbox 56C also provides drive to a differential gearbox 57C via a shaft 109C. A drive shaft 78C of an auxiliary power unit 70C provides a second input drive of the differential gearbox 57C and an output drive 110C of the differential gearbox 57C is arranged to drive an additional constant frequency/constant speed external, accessory, gearbox 56D. The additional constant frequency/constant speed external, accessory, gearbox 56D is arranged to drive an electrical generator 112D and one or more other accessories 116D, 120D via shafts 114D, 118D and 122D respectively. The one or more accessories may be at least one fuel pump, at least one oil pump or at least one oil breather etc. In this arrangement the final drive shaft 54C of the turbofan gas turbine engine 10C provides a first input drive of the differential gearbox 57C, via the variable speed external, accessory, gearbox 56C. Thus, the first gas turbine 10C is arranged to drive the first input drive of the differential gearbox 57C and the second gas turbine engine 70C is arranged to drive the second input drive of the differential gearbox 57C and the constant frequency output drive of the differential gearbox 57C drives an additional constant frequency external, accessory, gearbox 56D, which drives one or more constant frequency electrical generators 112D, one or more constant frequency accessories 116D and 120D. The advantage of this arrangement is that it allows the accessories to be driven at variable speed or constant speed, whichever is most suitable to the operational characteristics of the particular accessory.

Figure 5:
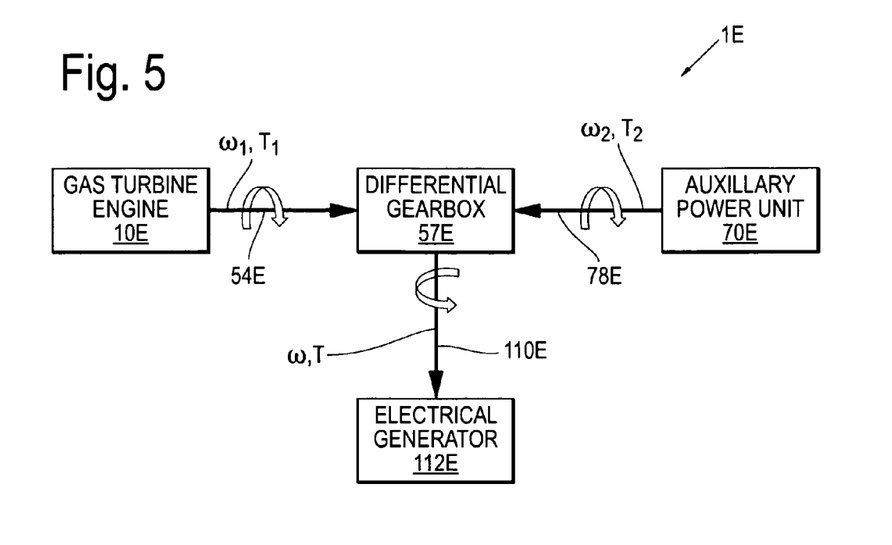
FIG. 5 shows an additional schematic view of a differential gearbox for a gas turbine engine arrangement according to the present invention.

In a further gas turbine engine arrangement 1E according to the present invention, as shown in FIG. 5, a final drive shaft 54E of a turbofan gas turbine engine 10E and the drive shaft 78E of an auxiliary power unit 70E provide drive to a constant frequency/constant speed electrical generator 112E. In particular the final drive shaft 54E of the turbofan gas turbine engine 10E and the drive shaft 78E of the auxiliary power unit 70E provide drive to a differential gearbox 57E.

The final drive shaft 54E of the turbofan gas turbine engine 10E provides a first input drive of the differential gearbox 57E, the drive shaft 78E of the auxiliary power unit 70E provides a second input drive of the differential gearbox 57E and an output drive 110E of the differential gearbox 57E is arranged to drive a constant speed, constant frequency, electrical generator 112E. Thus, the first gas turbine 10E is arranged to drive the first input drive of the differential gearbox 57E and the second gas turbine engine 70E is arranged to drive the second input drive of the differential gearbox 57E and the constant frequency output drive of the differential gearbox 57E drives one or more electrical generators 112E. The advantage of this arrangement is that there is no need for an external, accessory, gearbox because the electrical generator 112 may be used to provide electrical power for the engine accessories and the engine accessories are electrically driven.

The differential gearbox 57E is arranged such that first input drive, final drive shaft, 54E has a high torque $T_1$ but a relatively low speed $\omega_1$, the second input drive, drive shaft, 78E is arranged in the opposite manner and has a relatively low torque $T_2$ and a high speed $\omega_2$. Therefore the second input drive 78E has a mechanical advantage over the first input drive 54E. The output drive 110E has a torque T and a speed $\omega$ and these are a function of the combined torque and speeds of the first and second input drives 54E and 78E. Any suitable arrangement of differential gearbox may be used.

Figure 6:
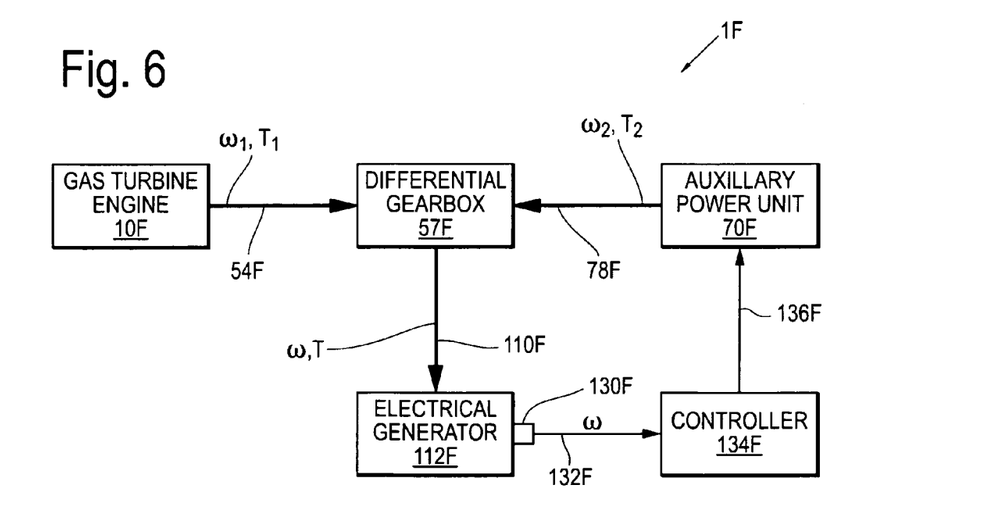
FIG. 6 shows a final schematic view of a differential gearbox for a gas turbine engine arrangement according to the present invention.

In an additional gas turbine engine arrangement 1F according to the present invention, as shown in FIG. 6, a final drive shaft 54F of a turbofan gas turbine engine 10F and a drive shaft 78F of an auxiliary power unit 70F again provide drive to a differential gearbox 57F. The final drive shaft 54F of the turbofan gas turbine engine 10F provides a first input drive of the differential gearbox 57F, the drive shaft 78F of the auxiliary power unit 70F provides a second input drive of the differential gearbox 57F and an output drive 110F of the differential gearbox 57F is arranged to drive an electrical generator 112F. Thus, the first gas turbine 10F is arranged to drive the first input drive of the differential gearbox 57F and the second gas turbine engine 70F is arranged to drive the second input drive of the differential gearbox 57F.

The differential gearbox 57F combines the power from the first and second input drives, e.g. the final drive shaft 54F of the turbofan gas turbine engine 10F, and the second input drive, the drive shaft 78F of the auxiliary power unit 70F, irrespective of the torques and speeds of the first and second input drives 54F and 78F. The resultant output drive 110F has a speed and a torque dependent upon the ratios within the differential gearbox 57F and the torques and speeds of the input drives 54F and 78F. However, the relative torque and speed of the input drives affects the proportion of power drawn from each input drive. The differential gear ratio is optimized based on the input torque and speed characteristics.

One embodiment of a differential gearbox for the present invention comprises a differential gearbox arranged such that the first drive input has a relatively high torque but a relatively low speed and the second input drive is arranged in the opposite manner with a relatively high speed and a relatively low torque and this gives the second input drive a mechanical advantage over the first input drive. Thus the second input drive has higher speed and lower torque compared to the first input drive. This arrangement is appropriate for a situation where the first input drive is coupled to the main source of power for the differential gearbox, e.g. the power offtake drive from a gas turbine engine. The second input drive is coupled to an auxiliary power unit, a smaller gas turbine engine producing power at a lower torque but at a higher speed. With a first input drive characterized by relatively high torque and relatively high power and a relatively slow control loop adjusting the speed and torque supplied. The auxiliary power unit controller and plant have a higher bandwidth than the main gas turbine engine. Other implementations are required if the inputs are geared to increase, or decrease, their relative speeds. Any suitable arrangement of differential gearbox may be used.

The gas turbine engine arrangement 1F also comprises a speed sensor 130F to measure the speed of the electrical generator 112F. The measurement of speed provided by the speed sensor 130F is supplied to a controller 134F via an electric cable 132F and the controller 134F is arranged to control the fuel flow 136F to the auxiliary power unit 70F in response to the measured speed of the electric generator 112F. In particular the auxiliary power unit 70F and controller 134F have a higher bandwidth than the turbofan gas turbine engine 10F and the output drive 110F supplies power to the electrical generator 112F which requires a narrow frequency input. The auxiliary power unit 70F, the drive shaft 78F and hence the second input drive has a fast response rate. Therefore the speed sensor 130F is used to determine variations in speed of the electric generator 112F and the controller 134F then adjusts the flow of fuel 136F to the auxiliary power unit 70F to maintain the speed of the output drive 110F substantially constant in response to variations in the speed of the final drive shaft 54F driven by the turbofan gas turbine engine 10F. Thus a constant frequency of electrical power is produced by the electric generator 112F.

Thus if the speed of the final drive shaft 54F decreases, a decrease in the speed of the output drive 110F is detected by the speed sensor 130F and the controller 134F supplies more fuel to the auxiliary power unit 70F to increase the speed of the drive shaft 78F to maintain the speed of the output drive 110F substantially constant.

Thus if the speed of the final drive shaft 54F increases, an increase in the speed of the output drive 110F is detected by speed sensor 130F and the controller 134F supplies less fuel to the auxiliary power unit 70F to decrease the speed of the drive shaft 78F to maintain the speed of the output drive 110F substantially constant.

Figure 7:
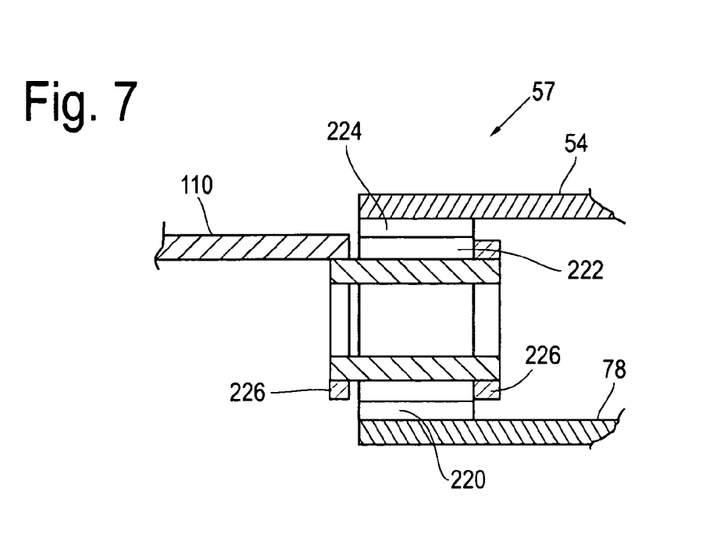
FIG. 7 is a cross-sectional view of one embodiment of a differential gearbox for a gas turbine engine arrangement according to the present invention.

A differential gearbox 57 for a gas turbine engine arrangement 1 according to the present invention is shown in FIG. 7. The differential gearbox is an epicyclic gearbox and comprises a sun gear 220, a plurality of planet gears 222 and an annulus gear 224. The planet gears 222 are arranged to mesh with the sun gear 220 and are arranged to mesh with the annulus gear 224. The planet gears 222 are rotatably mounted on a carrier 226. The second input drive, the drive shaft 78 of the auxiliary power unit 70 is connected to the sun gear 220, the first input drive, the final drive shaft 54 of the turbofan gas turbine engine 10 is connected to the annulus gear 224 and the output drive shaft 110 is connected to the carrier 226.

In a further arrangement, not shown, the second input drive, the drive shaft of the auxiliary power unit, may be connected to the sun gear, the first input drive, the final drive shaft of the turbofan gas turbine engine, may be connected to the carrier and the output drive shaft may be connected to the annulus gear.

In another arrangement, not shown, the second input drive, the drive shaft of the auxiliary power unit may connected to the annulus gear, the first input drive, the final drive shaft of the turbofan gas turbine engine, may be connected to the sun gear and the output drive shaft may be connected to the carrier.

The present invention therefore makes use of the auxiliary power unit during a flight. Normally the auxiliary power unit is not used during a flight. The present invention allows constant frequency electrical power to be produced and therefore the amount of power electronics and therefore the weight of an aircraft may be reduced.

The differential gearbox is arranged such that if the first input drive fails, then the differential gearbox is still able to drive the output drive and all the power is taken from the second input drive and similarly if the second input drive fails, then the differential gearbox is still able to drive the output drive and all power is taken from the first input drive. However, if there is only a single drive to the differential gearbox the electrical output from the electrical generator will be variable frequency, proportionally dependent on the speed of the remaining input drive. If only the first input drive, the turbofan gas turbine engine final drive shaft, remained the electrical output frequency of the electrical generator could remain relatively narrowband, because during the cruise phase of a flight there is little variation in the speed of the high pressure compressor, high pressure turbine and high pressure shaft. If only the second input drive, the auxiliary power unit drive shaft, remained the speed of the auxiliary power unit drive shaft may be controlled to maintain a narrowband electrical output frequency of the electrical generator.

However, to enable the differential gearbox to continue to drive the output drive, if there is only a single input drive to the differential gearbox, it is necessary to ensure that the failed input drive does not rotate. Therefore each input drive is provided with a brake, which is operable to prevent the respective input drive from rotating in the event of an input drive failure.

The electrical generator may be a generator/motor, or a generator/starter, such that the electrical generator may be supplied with electrical power to start the auxiliary power unit and/or the turbofan gas turbine engine if the electrical generator has sufficient power.

The auxiliary power unit may also be used to start the turbofan gas turbine engine using the differential gearbox. It would be necessary to gradually apply the auxiliary power unit drive to the turbofan gas turbine engine to prevent the auxiliary power unit from stalling. In an arrangement to prevent stalling of the auxiliary power unit during starting of the turbofan gas turbine engine, the output drive to the electrical generator is provided with a brake to prevent rotation of the output drive and electrical generator and a clutch, or a fluid coupling, is provided between the differential gearbox and the auxiliary power unit to cause a gradual transfer of starting torque to the turbofan gas turbine engine. In an alternative arrangement to prevent stalling of the auxiliary power unit during starting of the turbofan gas turbine engine, the output drive to the electrical generator is provided with a brake to prevent rotation of the output drive and electrical generator and a clutch, or a fluid coupling, is provided between the differential gearbox and the turbofan gas turbine engine to cause a gradual transfer of starting torque to the turbofan gas turbine engine. In a further arrangement to prevent stalling of the auxiliary power unit during starting of the turbofan gas turbine engine, the output drive to the electrical generator is provided with a brake to prevent rotation of the output drive and the generator brake or a generator load is applied to cause a gradual transfer of starting torque to the turbofan gas turbine engine.

Although the present invention has been described with reference to a first gas turbine engine being a turbofan gas turbine engine the present invention is equally applicable to other types of gas turbine engines, e.g. a turbojet, a turbo propeller, a turbo shaft, and is applicable to gas turbine engines for aircraft, for ships, for industrial use etc.

Although the present invention has been described with reference extracting power from the high pressure shaft of the first gas turbine engine it is equally possible to extract power from the intermediate pressure shaft of the first gas turbine engine or to extract power from the low pressure shaft of the first gas turbine engine.

Although the present invention has been described with reference to the use of an internal gearbox, a radial drive shaft, an intermediate gearbox, a further drive shaft and a final drive shaft to transmit drive, or to act as a power offtake, from the gas turbine engine to the external, accessory, gearbox or differential gearbox it may be possible to provide an internal gearbox, a radial drive shaft and a final drive shaft to transmit drive, or to act as a power offtake, from the gas turbine engine to the external, accessory, gearbox or differential gearbox. It may be possible to provide other arrangements of drive, or power offtake, from the gas turbine engine to the external, accessory, gearbox or differential gearbox.

The auxiliary power unit may be mounted on the fan casing of the turbofan gas turbine engine within the nacelle of the turbofan gas turbine engine such the auxiliary power unit drive shaft extends to the differential gearbox. In this arrangement the turbofan gas turbine engine nacelle is shaped to provide an aerodynamic shape. Alternatively the auxiliary power unit may be mounted on the aircraft structure, e.g. aircraft wing, close to the turbofan gas turbine engine and a drive shaft is provided to extend from the auxiliary power unit drive shaft to the differential gearbox on the turbofan gas turbine engine.

In a further embodiment, not shown, of the present invention instead of the auxiliary power unit a responsive electrical machine is provided to drive, or load, e.g. to supply power to, or to remove power from, the second input drive for the differential gearbox. The responsive electrical machine is arranged to provide a responsive electrical drive, or a responsive electrical load, on the second input drive to adjust the speed of the output drive of the differential gearbox and hence the speed of the electrical generator. The responsive electrical machine may be an electric motor or a high speed electrical machine used as an electrical load. If the responsive electrical machine is a high speed electrical machine used as a load, the high speed electrical machine may generate variable frequency (VF) electrical power, which may be rectified into a DC electrical signal/current or may be used for frequency insensitive applications, for example electrical heating. If the responsive electrical machine is an electric motor, the electric motor is a variable speed electric motor to provide speed correction for the differential gearbox as mentioned above with respect to the auxiliary power unit.

The present invention has been described with reference to the differential gearbox producing a constant frequency output from an electric generator driven by the output drive of the differential gearbox.

The present invention may also be used such that the differential gearbox produces a specific frequency output from the electric generator driven by the output drive of the differential gearbox. In this arrangement the frequency of the electric generator driven by the output drive of the differential gearbox is controlled by the differential gearbox to meet the frequency demand of the largest load on the electrical generators electrical network, for example the largest load may be an environmental conditioning system. This has the advantage of avoiding the need for power electronics on the largest load on the electrical network, whilst still allowing speed variation of the largest load.

The present invention may also be used such that the differential gearbox produces a direct current (DC) output from the electric generator, a DC electric generator, driven by the output drive of the differential gearbox. In this arrangement the DC electric generator is connected to a DC electrical network. The voltage output of the DC electrical generator varies with the speed applied to the rotor of the DC electrical generator and by using the first and second input drives of the differential gearbox the voltage of the DC electrical network may be maintained substantially constant. A constant DC voltage allows a more optimum design of electrical equipment loading the DC electrical network and may reduce the weight and size of electrical components, for example power electronic converters.

We claim:

1. A gas turbine engine arrangement comprising a first gas turbine engine, a power unit, a differential gearbox and at least one electrical generator, the differential gearbox having a first input drive, a second input drive and an output drive, wherein the differential gearbox comprises a sun gear, a plurality of planet gears, and an annulus gear, wherein the planet gears mesh with the sun gear and the annulus gear and the planet gears are rotatably mounted on a carrier, wherein the first input drive is affixed to one of the sun gear, the annulus gear, or the carrier, wherein the second input drive is affixed to one of either the sun gear or the annulus gear and is not affixed to the same structure as the first input drive, wherein the output is affixed to the carrier or the annulus gear and is not affixed to the same structure as either the first input drive or the second input drive the first gas turbine engine being an aircraft gas turbine engine, the power unit comprising a second gas turbine engine, the second gas turbine engine being an auxiliary power unit, the output drive of the differential gearbox being arranged to drive the at least one electrical generator, the first gas turbine engine being arranged to supply power to the first input drive of the differential gearbox, the power unit being arranged to supply power to, or remove power from, the second input drive of the differential gearbox, a first brake is provided between the first input drive and the first gas turbine engine, the first brake being operable to prevent rotation of the first input drive if the first gas turbine engine and/or the first input drive fails, a second brake is provided between the second input drive and the second gas turbine engine, the second brake being operable to prevent rotation of the second input drive if the second gas turbine engine and/or the second input drive fails, a clutch or a fluid coupling is operable to allow the second gas turbine engine to start the first gas turbine engine, the clutch or the fluid coupling being provided between the first input drive and the first gas turbine engine or between the second input drive and the second gas turbine engine, and the output drive has a brake operable to prevent rotation of the output drive to allow the second gas turbine engine to start the first gas turbine engine.

2. A gas turbine engine arrangement as claimed in claim 1 wherein the first gas turbine engine is a turbofan gas turbine engine.

3. A gas turbine engine arrangement as claimed in claim 1 wherein the first gas turbine engine drives the first input drive above a predetermined torque level and below a predetermined speed and the second gas turbine engine drives the second input drive with a torque level less than the predetermined torque level and with a speed above the predetermined speed.

4. A gas turbine engine arrangement as claimed in claim 1 wherein the first gas turbine engine has a power offtake and the power offtake is arranged to drive the first input drive.

5. A gas turbine engine arrangement as claimed in claim 1 wherein there are means to measure the speed of the first input drive and control means to adjust the speed of the second input drive such that the speed of the output drive is maintained substantially constant.

6. A gas turbine engine arrangement as claimed in claim 1 wherein there are means to measure the speed of the output drive and control means to adjust the speed of the second input drive such that the speed of the output drive is maintained substantially constant.

7. A gas turbine engine arrangement as claimed in claim 5 wherein the control means controls the supply of fuel to the second gas turbine engine.

8. A gas turbine engine arrangement as claimed in claim 1 wherein the electrical generator is a motor/generator to allow the electrical generator to start one of the first gas turbine engine and the second gas turbine engine.

9. A gas turbine engine arrangement as claimed in claim 1 wherein the second input drive is affixed to the sun gear, the first input drive is affixed to the annulus gear and the output drive is affixed to the carrier.

10. A gas turbine engine arrangement as claimed in claim 1 wherein the second input drive is affixed to the sun gear, the first input drive is affixed to the carrier and the output drive is affixed to the annulus gear.

11. A gas turbine engine arrangement as claimed in claim 1 wherein the second input drive is affixed to the annulus gear, the first input drive is affixed to the sun gear and the output drive is affixed to the carrier.

12. A gas turbine engine arrangement as claimed in claim 1 wherein the electrical generator is selected from the group comprising a constant frequency electrical generator, a specific frequency electrical generator and a DC electrical generator.

13. A gas turbine engine arrangement as claimed in claim 1 wherein the output drive of the differential gearbox is arranged to drive the electrical generator via an accessory gearbox and the accessory gearbox is arranged to drive at least one accessory.

14. A gas turbine engine arrangement as claimed in claim 1 wherein the first gas turbine is arranged to drive the first input drive of the differential gearbox via an accessory gearbox and the accessory gearbox is arranged to drive at least one accessory.

15. A gas turbine engine arrangement as claimed in claim 14 wherein the output drive of the differential gearbox is arranged to drive the electrical generator via an additional accessory gearbox.

16. A gas turbine engine arrangement as claimed in claim 15 wherein the additional accessory gearbox is arranged to drive at least one accessory.

17. A gas turbine engine arrangement as claimed in claim 13 wherein the at least one accessory is selected from the group comprising at least one fuel pump, at least one oil pump and at least one oil breather.

18. The gas turbine engine arrangement as claimed in claim 1 wherein
the power unit further comprises a responsive electrical machine.

19. A gas turbine engine arrangement as claimed in claim 18 wherein the responsive electrical machine is selected from the group comprising an electrical machine arranged to supply an electrical load and a variable speed electrical motor.

20. A gas turbine engine arrangement comprising a first gas turbine engine, a power unit, a differential gearbox and at least one electrical generator,
the differential gearbox having a first input drive, a second input drive and an output drive,
wherein the differential gearbox comprises a sun gear, a plurality of planet gears, and an annulus gear, wherein the planet gears mesh with the sun gear and the annulus gear and the planet gears are rotatably mounted on a carrier,
wherein the first input drive is affixed to one of the sun gear, the annulus gear, or the carrier,
wherein the second input drive is affixed to one of either the sun gear or the annulus gear and is not affixed to the same structure as the first input drive,
wherein the output is affixed to the carrier or the annulus gear and is not affixed to the same structure as either the first input drive or the second input drive
the first gas turbine engine being an aircraft gas turbine engine,
the power unit comprising a second gas turbine engine, the second gas turbine engine being an auxiliary power unit,
the output drive of the differential gearbox being arranged to drive the at least one electrical generator,
the first gas turbine engine being arranged to supply power to the first input drive of the differential gearbox and the power unit being arranged to supply power to, or remove power from, the second input drive of the differential gearbox,
a first brake is provided between the first input drive and the first gas turbine engine, the first brake being operable to prevent rotation of the first input drive if the first gas turbine engine and/or the first input drive fails,
a second brake is provided between the second input drive and the second gas turbine engine, the second brake being operable to prevent rotation of the second input drive if the second gas turbine engine and/or the second input drive fails,
a clutch or a fluid coupling is operable to allow the second gas turbine engine to start the first gas turbine engine, the clutch or the fluid coupling being provided between the first input drive and the first gas turbine engine or between the second input drive and the second gas turbine engine,
the output drive has a brake operable to prevent rotation of the output drive to allow the second gas turbine engine to start the first gas turbine engine
the output drive of the differential gearbox being arranged to drive the electrical generator via an accessory gearbox and the accessory gearbox being arranged to drive at least one accessory,
a sensor, the sensor being arranged to measure one of the group consisting of the speed of the first input drive and the speed of the output drive, and
a controller being arranged to adjust the speed of the second input drive such that the speed of the output drive is maintained substantially constant.

21. A gas turbine engine arrangement comprising a first gas turbine engine, a power unit, a differential gearbox and at least one electrical generator,
the differential gearbox having a first input drive, a second input drive and an output drive,
wherein the differential gearbox comprises a sun gear, a plurality of planet gears, and an annulus gear, wherein the planet gears mesh with the sun gear and the annulus gear and the planet gears are rotatably mounted on a carrier,
wherein the first input drive is affixed to one of the sun gear, the annulus gear, or the carrier,
wherein the second input drive is affixed to one of either the sun gear or the annulus gear and is not affixed to the same structure as the first input drive,
wherein the output is affixed to the carrier or the annulus gear and is not affixed to the same structure as either the first input drive or the second input drive
the first gas turbine engine being an aircraft gas turbine engine,
the power unit comprising a second gas turbine engine, the second gas turbine engine being an auxiliary power unit,
the output drive of the differential gearbox being arranged to drive the at least one electrical generator, the first gas turbine engine being arranged to supply power to the first input drive of the differential gearbox and the power unit being arranged to supply power to, or remove power from, the second input drive of the differential gearbox, a first brake is provided between the first input drive and the first gas turbine engine, the first brake being operable to prevent rotation of the first input drive if the first gas turbine engine and/or the first input drive fails, a second brake is provided between the second input drive and the second gas turbine engine, the second brake being operable to prevent rotation of the second input drive if the second gas turbine engine and/or the second input drive fails, a clutch or a fluid coupling is operable to allow the second gas turbine engine to start the first gas turbine engine, the clutch or the fluid coupling being provided between the first input drive and the first gas turbine engine or between the second input drive and the second gas turbine engine, the output drive has a brake operable to prevent rotation of the output drive to allow the second gas turbine engine to start the first gas turbine engine a sensor, the sensor being arranged to measure one of the group consisting of the speed of the first input drive and the speed of the output drive, and a controller being arranged to adjust the speed of the second input drive such that the speed of the output drive is maintained substantially constant.

* * * * *